US007394226B1

(12) United States Patent
Adler

(10) Patent No.: US 7,394,226 B1
(45) Date of Patent: Jul. 1, 2008

(54) HIGH VOLTAGE GENERATION SYSTEMS AND METHODS

(75) Inventor: Richard J. Adler, Marana, AZ (US)

(73) Assignee: Applied Energetics, Inc., Tuscon, AZ (US)

(*) Notice: Subject to any disclaimer, the term of this patent is extended or adjusted under 35 U.S.C. 154(b) by 183 days.

(21) Appl. No.: 11/345,857

(22) Filed: Feb. 1, 2006

(51) Int. Cl.
*H02H 7/06* (2006.01)

(52) U.S. Cl. .................................. 322/20; 323/207

(58) Field of Classification Search ............ 323/207, 323/223, 282, 283; 322/19, 20, 58, 59
See application file for complete search history.

(56) References Cited

U.S. PATENT DOCUMENTS

| 4,193,111 | A | * | 3/1980 | Wester | 363/84 |
| 4,989,127 | A | * | 1/1991 | Wegener | 363/16 |
| 6,809,678 | B2 | * | 10/2004 | Vera et al. | 341/166 |
| 6,954,366 | B2 | * | 10/2005 | Lai et al. | 363/71 |
| 2002/0070117 | A1 | * | 6/2002 | Gutierrez et al. | 205/80 |
| 2004/0119448 | A1 | * | 6/2004 | Weigand et al. | 323/223 |
| 2005/0151517 | A1 | * | 7/2005 | Cook et al. | 323/207 |

* cited by examiner

*Primary Examiner*—Akm Enayet Ullah
*Assistant Examiner*—M'Baye Diao
(74) *Attorney, Agent, or Firm*—Duft Bornsen & Fishman, LLP; Gregory T. Fettig

(57) ABSTRACT

Systems and methods presented herein generally provide for the controlled voltage of electrical energy through the selected operation of power stages. Generally, a system that provides electrical energy includes a power supply and up to 20 power stages coupled to the power supply such that the system may output up to 72 kV in 3.6 kV increments. By selecting the number of power stages which are turned on at a given time the total voltage of the electrical energy is controlled at that time. The use of air core magnetic flux coupling provides a unique, easily insulated method to provide power to the voltage stages at different potentials relative to each other. The system may further include one or more controllers coupled to the power stages to control selection of the power stages and thereby vary the output voltage.

16 Claims, 7 Drawing Sheets

HIGH VOLTAGE GENERATION SYSTEMS AND METHODS

GOVERNMENT LICENSE RIGHTS

The U.S. Government has a paid-up license in this invention and the right in limited circumstances to require the patent owner to license others on reasonable terms as provided for by the terms of contract No. N00164-04-C-8906 awarded by Department of the Navy."

CROSS REFERENCE TO RELATED APPLICATIONS

This patent application is related to commonly owned and U.S. patent application Ser. No. 11/345,416 (filed Feb. 1, 2006 hereinafter referred to as the "U.S. Pat. No. 7,345,430") and the entire contents of which are hereby incorporated by reference.

TECHNICAL FIELD

Systems and methods presented herein are generally directed to controllably changing output voltage of electrical energy. More specifically, the systems and methods provide for changing output voltage of high-voltage electrical energy to control the waveform of the high voltage electrical energy.

BACKGROUND

Electrical power supplies provide electrical energy for a variety of applications. Often, power supplies receive electrical energy from a source, such as a generator, and convert that electrical energy to an application-specific form. For example, a power supply may receive electrical energy as alternating current ("AC") and convert that electrical energy to direct current ("DC"). The power supply may then provide the DC electrical energy to a device (e.g., a "load") to operate the device. Lower voltage power supplies are routinely built at voltages up to 10V and, in some instances, output arbitrary and/or pre-programmed waveforms as a function of time. Such devices are generally referred to as Arbitrary Waveform Generators, or "AWGs".

Higher-voltage power supplies are generally those power supplies providing electrical energy at voltages of greater than 100 volts, often having more unique applications than their lower voltage counterparts. For example, high-voltage pulsed power supplies may be used in certain types of ion implantation, such as Plasma Source Ion Implantation ("PSII") and/or Shallow Implantation and Diffusion Hardening ("SIDH"). In this regard, such power supplies may be used to control doping profiles in semiconductors.

In PSII, a target (e.g., a silicon wafer) is placed directly inside an ion source. High voltage negative pulses applied to the target attract positive ions in the plasma and thereby strike the target at normal angles of incidence. Similarly, in SIDH, the target is immersed in a plasma and pulsed with high-voltage electrical energy. The pulsing of the electrical energy allows the plasma to penetrate and diffuse within the target. High-voltage power supplies, however, are not limited to such applications. Rather, high-voltage power supplies may be used in a variety of applications, such as plastic curing and medical imagery (e.g., x-rays).

SUMMARY

Systems and methods presented herein generally provide for the controlled voltage of electrical energy through the selected operation of a series of power stages. In one embodiment, a system that provides electrical energy includes a power supply and at least two power stages coupled to the power supply to provide power at an output (e.g., to a load coupled to the power stages). The power stages can selectively output electrical energy. Selected power stages control voltage of the electrical energy. For example, one turned-on power stage may provide an output of $1*V$ volts, a second turned-on power stage, in combination with the first, may provide an output of $2*V$ volts, and so on. In one embodiment, the system may provide greater than 1 kilovolts ("kV") of output electrical energy and, in some cases, greater than 1 megavolts ("MV").

Generally, the system includes a power stage configuration of 20 or less power stages with approximately 3.6 kV per stage. As such, the system may generate an output voltage of up to about 72 kV. Such an embodiment has been physically reduced to practice under the above referenced contract awarded by the Department of the Navy. The individual power stages, however, may be configured to output voltages less than 3.6 kV such that the total output voltage of the system is reduced. For example, a system that includes 20 power stages with each configured to output approximately 2 kV may select output voltages ranging from 0V to about 40 kV.

The system may further include a controller coupled to the power stages to control selection of the power stages. For example, a single controller may be configured with the power stages to control such operational aspects. Alternatively, or in addition to, each power stage may include one or more drivers that control various operational aspects of the individual power stage, such as whether the output of the stage is turned "on". For example, the controller may be communicatively coupled to the drivers to control operation of the power stages.

The system may further include a storage unit that stores instructions with each driver. The instructions may be software instructions that direct arbitrary selection by the controller of the power stages. Alternatively, the software instructions may direct selection by the controller of the at least two power stages according to a predetermined sequence.

A power stage may include a rectifier. In such an embodiment, the power supply may provide AC electrical energy such that the rectifier receives the AC electrical energy and provides a substantially unipolar electrical energy. The power supply may be a high-voltage electrical energy power supply. Additionally, the power stage may include a signal input that controls the power stage.

In one embodiment, the power stages are serially coupled to additively control voltage of the electrical energy. For example, when serially coupled, voltage of electrical energy from a first power stage may add/subtract to voltage of electrical energy from one or more other power stages.

The power stages may include a coil that magnetically couples to the power supply (e.g., via a primary coil) to receive the electrical energy. Additionally, the power stages may include an output filter. The output filter of a power stage may output electrical energy when the power stage is operable. In one embodiment, the filter of a power stage has a bandwidth of about 1 MHz. This can be used to smooth the generated waveform.

In another embodiment, a method of controlling voltage of electrical energy includes generating electrical energy and providing the electrical energy to at least two power stages. Additionally, the method includes selecting operability of the power stages to control voltage of the electrical energy. For example, with one power stage operating, a voltage of 1*V may be output; with 2 power stages operating, a voltage of 2*V may be output, etc.

Providing the electrical energy may include magnetically coupling electrical energy to the power stages. Controlling operability of the power stages may include generating at least one control signal to operate at least one switch with a first of the power stages. For example, generating at least one control signal may include processing instructions that direct the power stages to arbitrarily conduct the electrical energy or direct the power stage to conduct the electrical energy according to a predetermined sequence.

In one embodiment, the method further includes receiving an input signal with a driver to direct a power stage to conduct the electrical energy. In this regard, the controller may generate control signals that are received by the driver to control operability of the power stages. The control signals may include electronic signals and/or optoelectronic signals. For example, the driver may be configured with an amplifier to receive an electronic control signal at its input such that the amplifier generates a signal for disconnecting a power stage from electrical conduction. Alternatively or additionally, the driver may be configured with a fiber-optic receiver that receives an optical signal at its input such that the driver generates a signal for disconnecting a power stage from electrical conduction.

The method may also include outputting voltage controlled electrical energy. The method may also include filtering the electrical energy when one or more of the power stages are operable. For example, the method may include filtering the electrical energy by bandwidth limiting the electrical energy to approximately 1 MHz. The electrical energy input may be AC electrical energy and, as such, the method may further include converting AC electrical energy to unipolar electrical energy. The sequencing of power stages may arbitrarily convert the output voltage of the electrical energy to a high voltage output.

In another embodiment, a system that controls voltage includes a power supply and a plurality of power stages coupled to the power supply, wherein the power stages are coupled in series and receive electrical energy from the power supply. The system also includes at least one controller communicatively coupled to the power stages, wherein the controller operates the power stages to control the voltage of the electrical energy output from the system. The power supply may be a high voltage power supply.

The system may further include a storage element that stores instructions. For example, the instructions may direct the controller to substantially arbitrarily select zero or more power stages to control the voltage of the electrical energy output from the system. Alternatively, the instructions may direct the controller to select zero or more power stages according to a predetermined sequence to control the voltage of the electrical energy output from the system. In one embodiment, the controller generates one or more control signals that are received by a respective one or more drivers to direct the drivers to select zero or more power stages. Since the drivers connect and disconnect power stages from electrical conduction, the controller controls the voltage of the electrical energy output from the system via the control operation of the drivers.

In another embodiment, a system that provides electrical energy includes a power supply and at least two power stages coupled to the power supply. The power stages are operable to receive electrical energy from the power supply. The system also includes at least two drivers. For example, a driver may be a part of the power stage which receives and implements instructions from an external controller. A first of the drivers is configured with a first of the power stages and a second of the drivers is configured with a second two power stages. The controller cooperatively selects zero or more drivers for electrical conduction to thereby control electrical energy output from the power stages.

DETAILED DESCRIPTION OF THE DRAWINGS

Figure 1:
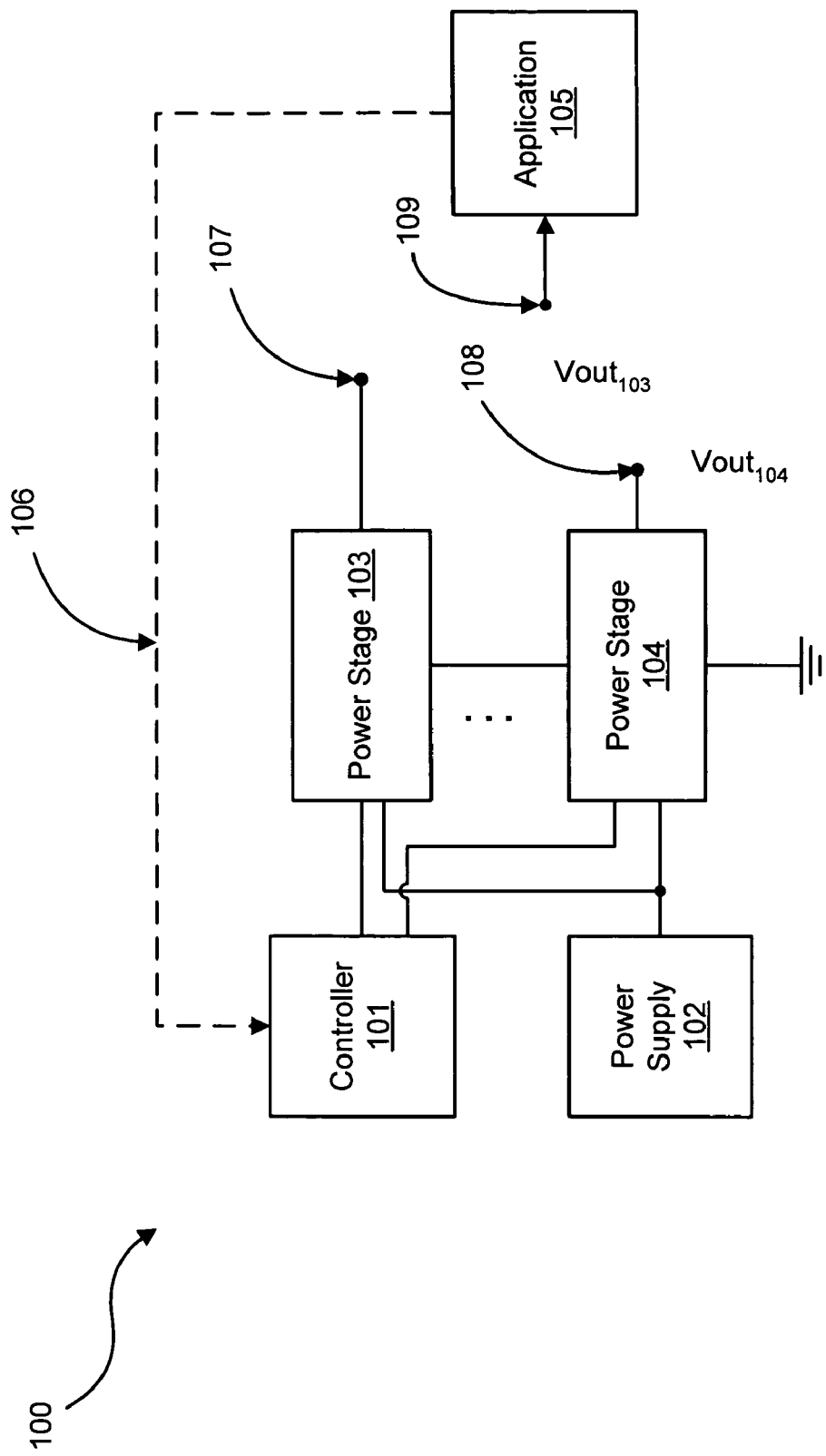
FIG. 1 is a block diagram of an exemplary system that provides electrical energy.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

FIG. 1 is a block diagram of exemplary system 100. System 100 is configured for providing electrical energy for use by application 105. For example, application 105 may include the conduction of electrical energy through a gas such as air. In such an application, it may be desirable to maintain the coherency of the electrical energy conduction by reducing energy-draining spurious discharges. Since the gas through which the electrical energy is conducted may have inconsistencies (e.g., due to the natural occurrence of spurious discharges), system 100 may controllably vary the voltage of the electrical energy to compensate for such changes and thereby maintain a more coherent electrical energy conduction.

System 100 includes power supply 102 for generating electrical energy. In one embodiment, power supply 102 generates high-voltage AC electrical energy. The generated electrical energy is provided to power stages 103 and 104 for output to application 105. In one embodiment, power supply 102 couples to power stages 103 and 104 to deliver the electrical energy. For example, power supply 102 may include a coil that couples (e.g., magnetically) to coils of power stages 103 and 104. Such a coupling is described in greater detail below in FIGS. 2 and 3.

In one embodiment, power supply 102 is capable of delivering peak power of about 100 kilowatts ("kW"). Additionally, power supply 102 may pulse the AC electrical energy, for example, at a frequency of about 100 kHz. The output waveform of the energy pulses may have durations of about 5 milliseconds ("ms"). The output waveform can also have transitions as rapid as a "Turn-on" time ("$T_{on}$") of less than 0.5 μsec. Similarly, the "Turn-off" time ("$T_{off}$") can be as short as 0.5 μsec. Additionally, the energy stored in the power stage may be in the exemplary range of 3 joules to 5 joules and 1 MV unit there would be exemplarily configured with about 260 3.8 kV stages.

System 100 controllably selects operation of power stages 103 and 104 such that the electrical energy is arbitrary, when output to application 105 at node 109 via nodes 107 and/or 108. For example, power stages 103 and 104 may be coupled in series to additively provide electrical energy (i.e., the output voltage from system 100 is increased by selecting more power stages for operation and decreased by deselecting power stages from operation). As such, output voltage $Vout_{103}$ of power stage 103 may combine with output voltage $Vout_{104}$ of power stage 104 to add or subtract from the total output voltage of system 100 depending on the operation of the power stages.

In one embodiment, power stages 103 and 104 convert the high-voltage AC electrical energy to a substantially unipolar waveform (e.g., all positive voltages or all negative voltages not including bias). Additionally, power stages 103 and 104 may provide filtering of the output electrical energy depending on a particular application. Such waveform generation and filtering are discussed in greater detail below in FIG. 2.

To control the operation of power stages 103 and 104, system 100 includes controller 101 which generates control signals to select and deselect power stages, thereby controlling the output voltage of the electrical energy from system 100. In one embodiment, controller 101 may be externally controlled in real time or externally programmed with stored waveform creation information.

Additionally, implementation of controller 101 may be application-specific. For example, controller 101 may be configured as a microprocessor with associated instruction storage. As such, controller 101 may process the instructions to determine the output voltage of the electrical energy provided to application 105. In one embodiment, instructions direct operation of power stages 103 and 104 in a arbitrary or predetermined fashion. In another embodiment, controller 101 may be configured with a signal input. For example, controller 101 may receive and process an input signal to direct operational selection of power stages 103 and 104. The input signal may be a feedback signal from application 105. Based on the feedback signal, controller 101 may determine a requisite voltage for application 105 and accordingly control operation of power stages 103 and 104.

Although shown and described with respect to two power stages 103 and 104, those skilled in the art should readily recognize that the invention is not intended to be limited to a particular number of power stages. Rather, system 100 as illustrated is merely suggestive of an electrical energy delivery system that may include numerous more power stages. In one embodiment, system 100 may include as many as 294 power stages for delivering about 1 MV of electrical energy at approximate 3.5 kV increments.

In one specific embodiment physically reduced to practice under the above referenced contract awarded by the Department of the Navy, system 100 includes a power stage configuration of 20 or less power stages with approximately 3.6 kV per stage. In this regard, the system may generate an output voltage of up to about 72 kV. The individual power stages, however, may be configured to output voltages less than 3.6 kV such that the total output voltage of system 100 is reduced. For example, a system that includes 20 power stages with each configured to output approximately 2 kV may select output voltages ranging from 0V to about 40 kV.

As shown herein, system 100 may be configured to incrementally provide 2 MV. Power stages 103 and 104 and additional series stages may also cooperatively provide increments of 3.5 kV, 7 kV, 10.5 kV, 14 kV, . . . , 1001 kV, 1004.5 kV, . . . , 1998.5 kV, 2002 kV. But, as stated, more power stages may be added to system 100 to increase definition of electrical energy output voltage to application 105.

Although application 105 is initially described with respect to conducting electrical energy through a gas, those skilled in the art should readily recognize that the invention is not intended to be limited to such an application. Rather, system 100 may be configured to provide electrical energy for a variety of applications. Some non limiting examples of such applications may include plastic curing, high-power transmitter systems, ion implantation systems, and medical imagery systems (e.g., x-rays systems).

Figure 2:
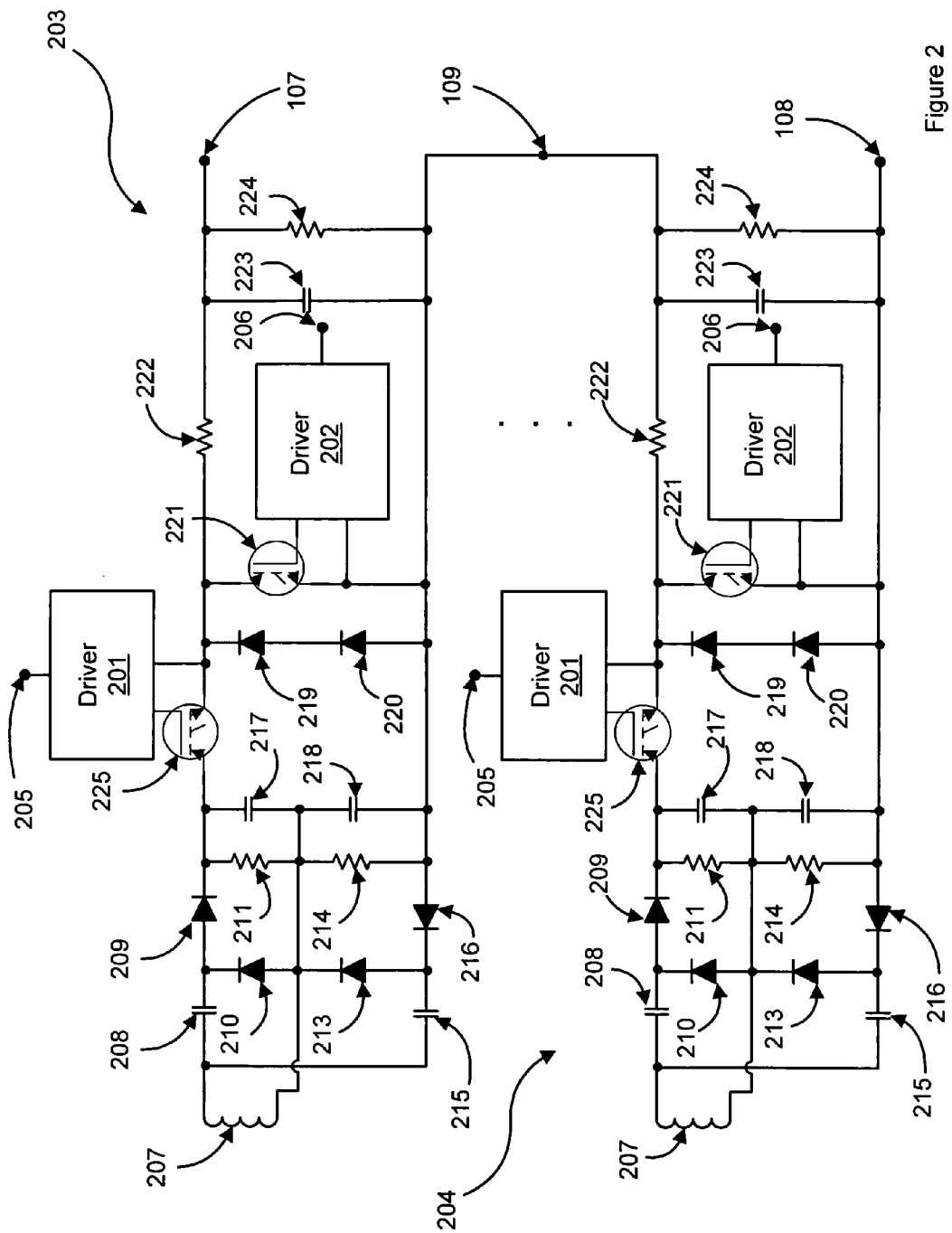
FIG. 2 is a circuit diagram of exemplary power stages that output electrical energy.

FIG. 2 is a circuit diagram of exemplary power stages 203 and 204 that output electrical energy via output nodes 107 and/or 108. For example, power stages 203 and 204 may be serially coupled at node 109 such that output voltage of the electrical energy adds via output nodes 107 and 108 when provided to an application, such as application 105 of FIG. 1. By controlling operability of power stages 203 and 204, voltage of the electrical energy provided to the application between nodes 107 and 108 may decrease or increase. That is, when power stages 203 or 204 are operable, maximum voltage may be applied to the application via node 109. When one of power stages 203 or 204 is turned off, the voltage applied to the application may be half of the maximum voltage at node 109. Similarly, when both power stages 203 and 200 are turned off, no voltage is applied to the application via node 109.

In this embodiment, power stages 203 and 204 are configured identically. As such, it is only necessary to discuss operability of a single power stage, e.g., power stage 203. However, those skilled in the art should readily recognize that power stages 203 and 204 may be configured differently and, as such, the invention is not intended to be limited to the illustrated embodiment.

Power stage 203 receives electrical energy from a power supply, such as power supply 102 of FIG. 1, via coil 207. For example, the power supply may include a coil that magnetically couples to coil 207. Accordingly, the power supply and coil 207 may form a transformer that delivers electrical energy from the power supply to power stage 203. The use of air core coupling with the transformer provides an intrinsically safe manner for providing a power to power stages 203 and 204. For example, magnetic couplings of coils may decrease opportunities for sparking that are often inherent in conductive core isolation transformers and power supplies. By using "air core" coupling, the distance between the primary and secondary can be made large without reducing efficiency. However, the invention is not intended to be limited to coils for receiving power signals as other forms of energy transfer may be used (e.g., units connected to isolation transformers or separate power supplies). An example of such a coupling is shown and described below in FIG. 3.

The received electrical energy conducts to a prefilter/rectifier section of power stage 203. The prefilter/rectifier section is configured from: capacitors 208 and 215; diodes 210, 213, 216, and 209; and resistors 211 and 214. These components are used to provide an initial filter of the received electrical energy. For example, the received electrical energy may be a high voltage AC waveform (e.g., wherein the voltage is greater than a 100 kV). Noise on such a waveform may be magnified because of the order of magnitude of the waveform. Such noise may have undesirable effects on the application (e.g., energy-draining spurious transmissions during electrical energy conduction through a gas). In addition to filtering, the prefilter/rectifier section may convert and multiply the AC waveform to a unipolar signal (i.e., the prefilter/rectifier section may "full wave" rectify and amplify the AC waveform).

The filtered and rectified waveform may then charge output capacitors 217 and 218 and thereby provide electrical energy to the application, e.g., via capacitors 217 and 218. Capacitors 217 and 218 may provide the "compliance current" such that electrical current may be supplied, for example, with only a minimal voltage decrease. This current may be determined by resistor 222 when power stage 203 is operational. In one embodiment, capacitors 217 and 218 provide a combined capacitance of about 0.5 microfarads ("µF"). In such an embodiment, resistor 222 may be about 30 Ohms ("Ω"). Additionally, since the number of power stages may in one embodiment be 294, the combined capacitance of the power stages may be about 1700 picofarads ("pF"; e.g., 0.5 uf/294 series stages=1700 pf).

Power stage 203 also includes driver 201 and transistor 225 to control operability of the power stage. For example, driver 201 may generate a control signal which operates transistor 225. When transistor 225 is turned on by the control signal, electrical energy stored with capacitors 217 and 218 may be discharged to output node 107. When transistor 225 is turned off by the control signal operated through driver 201, electrical energy discharge from capacitors 217 and 218 is controllably disengaged from output node 107. In one embodiment, transistor 225 is an Insulated Gate Bipolar Transistor ("IGBT").

In this embodiment, power stage 203 also includes an output filter to provide post filtering of the rectified waveform. The output filter shown herein is a low pass filter configured from resistor 222 and capacitor 223. For example, the high voltage AC waveform as rectified by the prefilter/rectifier section may include noise, e.g., introduced by components of power stage 203, such as transistor 225. The output filter may remove higher frequency components of the noise because, again, such noise may have undesirable effects. In one embodiment, the bandwidth of the output filter is up to about 1 MHz. However, the output filter may be configured with other bandwidths depending on a particular application.

Additionally, power stage 203 is configured with resistor 224 to provide a naturally occurring voltage decrease. For example, when a lower output voltage is desired, operation of power stage 203 may be shut down with a control signal from driver 201 and, as previously stated, electrical energy from capacitors 217 and 218 is controllably disengaged. However, the output voltage via output node 107 naturally decays due to the exponential decay coefficient formed by capacitor 223 and resistor 224. Accordingly, power stage 203 may provide a gradual voltage decrease when desired. In one embodiment, capacitor 223 is about 0.005 µF and resistor 224 is about 200 kΩ which provides a gradual decay in voltage (e.g., the electrical energy is discharged about 1 millisecond after the operation of power stage 203 is shut down). Again, since the number of power stages may in one embodiment may be 294, the combined capacitance of the power stages may be about 17 pF (e.g 0.005 uF/294 stages=17 pf).

Power stage 203 may include driver 202 to rapidly disengage discharge of electrical energy from capacitors 217 and 218 via node 107. For example, when a rapid decrease in voltage is desired, driver 202 may generate a control signal which turns on transistor 221 for conduction of electrical energy to ground. With transistor 225 turned off, electrical energy stored with capacitor 223 may discharge to ground through transistor 221. Capacitor 223 may also provide the compliance current as limited by resistor 222.

To generate control signals, drivers 201 and 202 may receive control signals from external sources. For example, controller 101 of FIG. 1 may generate control signals that are received by drivers 201 and 202. In response, drivers 201 and 202 may generate control signals that operably control switches 225 and 221, respectively. In one embodiment the control signals from the controller are optical control signals. In this regard, drivers 201 and 202 may include fiber-optic receivers that received in process the optical control signals from the controller even in the presence of significant voltage differences.

The fiber-optic receivers may provide certain advantages in minimizing direct electrical influence (e.g., via electronic control signals) that could possibly disrupt high voltage operations of the system, such as system 100 FIG. 1. For example, power stages 203 and 204 may provide high voltage electrical energy and, as such, may require materials not readily used in lower voltage power supplies, such as transformer oil. Such materials may reduce the effectiveness of direct electronic control. Fiber-optic connections to drivers 201 and/or 202 may circumvent such. However, those skilled in the art should readily recognize that the invention is not intended to be limited to fiber-optic receivers as such power stages may be used in lower voltage power supplies where electronic control and/or inductive control (e.g., inductors used in sensing) may be preferred. Those skilled in the art are familiar with fiber-optic receivers. An example of a driver configured with a fiber-optic receiver is shown and described below and FIG. 4.

Additionally, drivers 201 and 202 may include storage units that store software instructions to direct the drivers to control operability of power stage 203 responsive to the input signals. These software instructions may include arbitrarily directing drivers 201 and 202 to operate transistors 225 and 221, thereby arbitrarily engaging power stage 203 for providing electrical energy to output node 107. However, drivers 201 and 202 may be configured in other ways as a matter of design choice. For example, driver 201 may include circuitry that responds to an input signal delivered via input 205. In response to the input signal, driver 201 may generate a control signal to operate switch 225. In this regard, a controller, such as controller 351 of FIG. 5, may provide control signals to inputs 205 and 206 of drivers 201 and 202, respectively, to control the operability of power stage 203.

Also shown with power stage 203 are diodes 219 and 220. Diodes 219 and 220 are configured to allow current to flow around the power stage 203 when 225 is turned off. In one embodiment, many components of power stage is 203 and 204 are designed for high voltage operations. For example, power stages 203 and 204 may be configured for operating at up to 2 MV when numerous stages are used. Accordingly, coil 207, capacitor 208, capacitor 215, capacitor 217, capacitor 218, capacitor 223, resistor 211, resistor 214, resistor 222, resistor 224, diode 210, diode 213, diode 209, diode 216, diode 219, diode 220 may each be configured as high voltage components expressly designed for such high voltage operations. Those skilled in the art are readily familiar with such components and their high voltage configurations.

Although one embodiment has been shown and described, the invention is not intended to be limited to the particular circuit shown herein. Rather, those skilled in the art should readily recognize that the invention may be configured in other ways that fall within the scope and spirit of the invention. For example, power stages 203 and 204 may be simply configured with single drivers 201 without using the substantially instantaneous shut down of a power stage provided by drivers 202 and transistors 221. Nor is the invention intended to be limited to the number of power stages shown and described herein. Rather, power stages 203 and 204 simply illustrate a scalable structure that receives electrical energy from a power supply and provides increments of that electrical energy based on the operations of the power stages. For example, a system, such as system 100 of FIG. 1, may include as many as 294 power stages 203/204 for delivering about 1 megavolt ("MV") of electrical energy at approximate 3.5 kilovolts ("kV") increments (e.g., 3.5 kV per power stage).

Additionally, the scalability of the power stages may not represent identical voltage increments. For example, power stages may be configured differently such that each provides a unique voltage when operational. Such may be accomplished through the magnetic coupling of coils 207 (i.e., of power stages 203 and/or 204) to a power supplying coil. That is, each coil 207 may be configured with a unique number of turns such that each coil 207, when magnetically coupled with the power supplying coil forms a transformer with a turns ratio that transforms the voltage from a first level to a second level. Transformers and their respective voltage amplification based on turns ratios are known to those skilled in the art.

Figure 3:
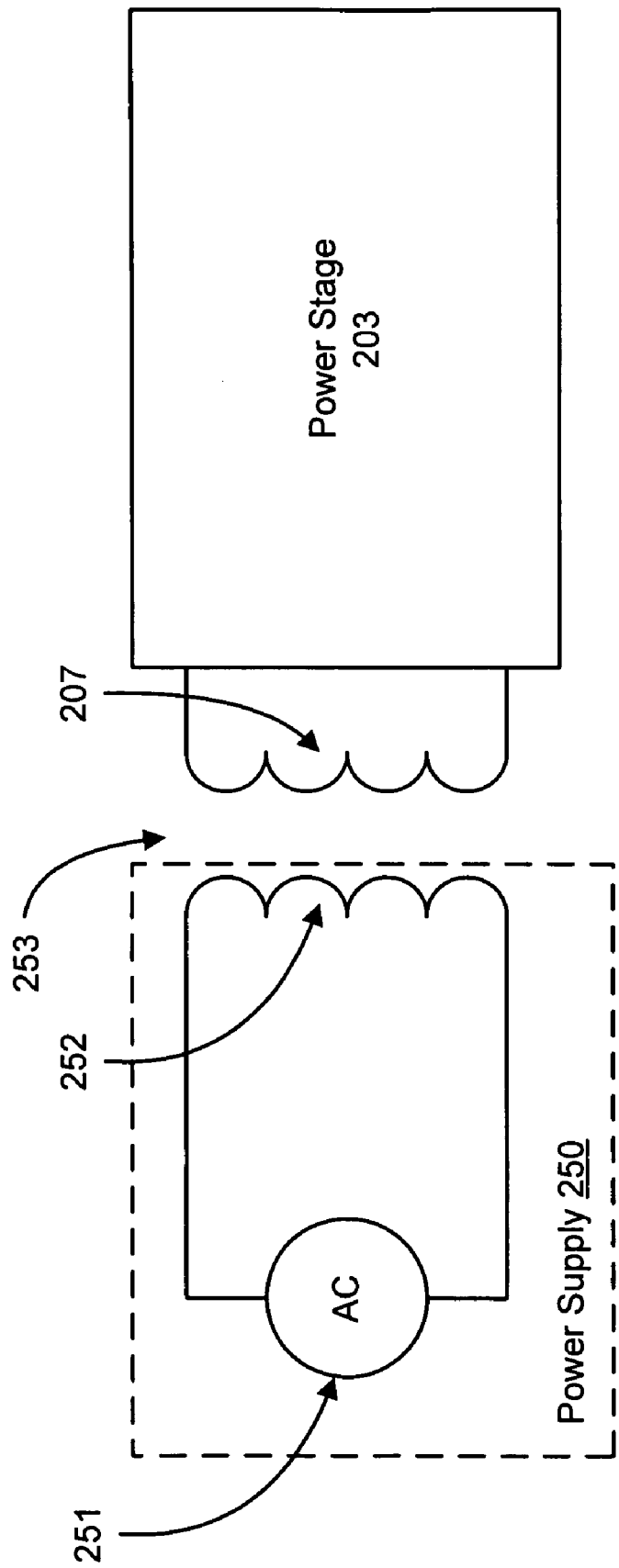
FIG. 3 is a block diagram of an exemplary power supply/power stage coupling.

FIG. 3 is a block diagram of an exemplary power supply/power stage coupling. For example, FIG. 3 illustrates a magnetic coupling between power supply 250 and power stage 203 of FIG. 2. In this embodiment, power supply 250 includes AC power source 251 for providing AC electrical energy to coil 252. Coil 252 magnetically couples to coil 207 of power stage 203. As such, coils 252 and 207 provide a transformer coupling having core 253 between power supply 250 and power stage 203.

As known to those skilled in the art, transformers may "step up" or "step down" voltage of electrical energy based on a turns ratio of the transformer and based on various resonance conditions. In one embodiment, the turns ratio between coil 252 and 207 is configured for providing an amplification of voltage from power supply 250 to about 3.5 kV output from power stage 203. However, other voltage outputs from power stage 203 may be desirable based on a particular application. Additionally, the voltage conversion may be intrinsically safe because electrical conduction between the coils is avoided. Core 253 may be an air core as ferrous materials add significant complexity to the design of high-voltage electrical power supplies.

Figure 4:
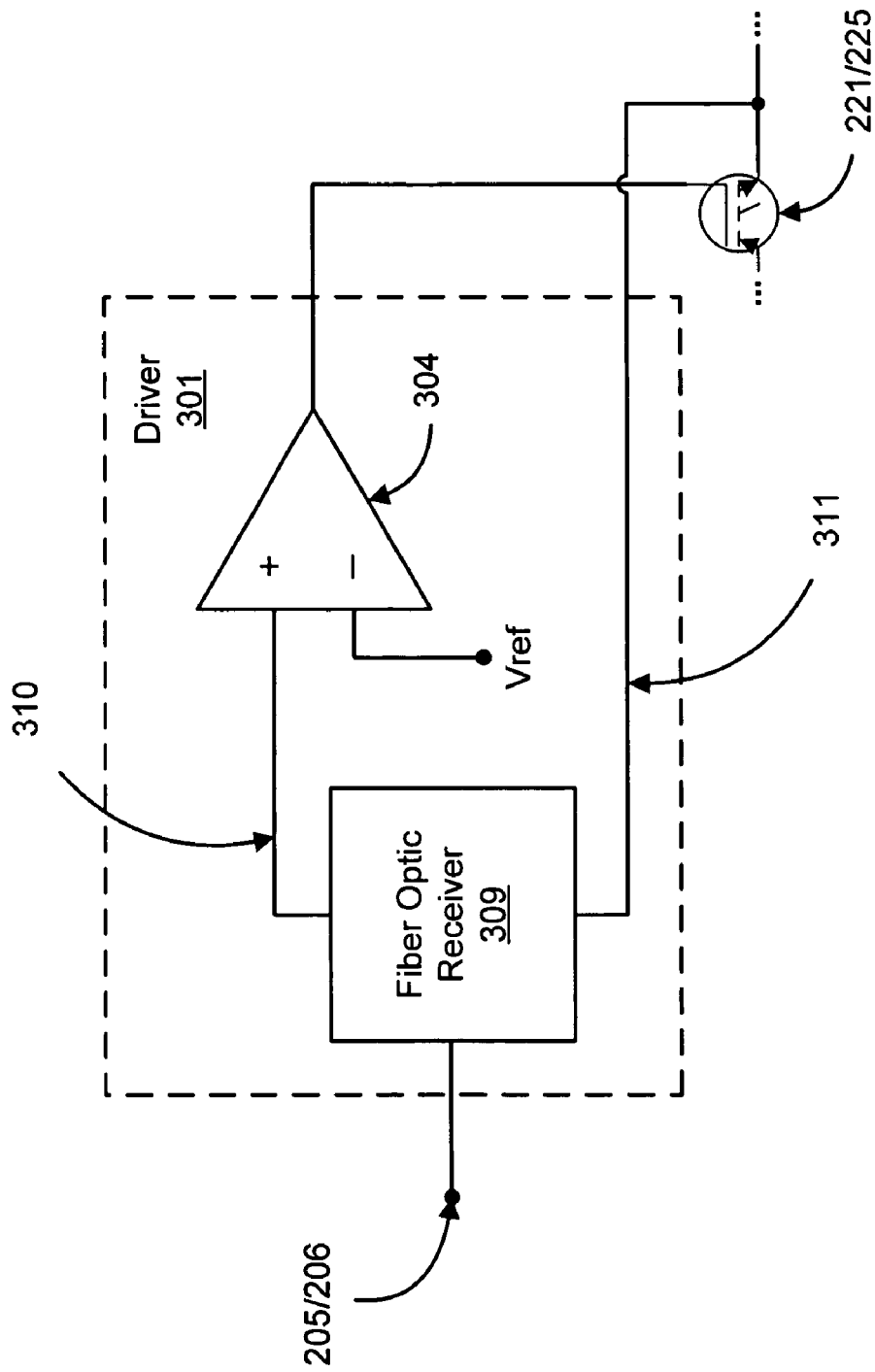
FIG. 4 is a circuit diagram of an exemplary driver that drives a power stage.

FIG. 4 is a circuit diagram of exemplary driver 301 that drives a power stage. For example, driver 301 may be implemented as driver 201 and/or 202 of power stage 203 of FIG. 2. In this embodiment, driver 301 is configured with input 205 or 206 as shown in FIG. 2. Driver 301 may receive an input signal via a fiber optic connection with input 205/206. In response thereto, driver 301 may generate a control signal that is used to drive the power stage. However, other forms of control may be used (e.g., wireless communication, electronic control, etc.).

To generate the control signal, driver 301 may include amplifier 304 and fiber optic receiver 309 to supply the control signal. Input 205/206 may receive a control signal from a controller, such as controller 101 of FIG. 1 described hereinabove. In this regard, the control signal is provided to input 205/206 to provide substantially arbitrary control over transistor 221/225. For example, certain applications may desire transistor 221/225 to arbitrarily turn off and on thereby turning the power stage off and on. An example of such an application may include the conduction of electrical energy through a gas. Once a conduction path has been generated through the gas, controlled application of electrical energy to that path may assist in sustaining the path because, among other reasons, controlled decreases in voltage may deter energy-draining spurious discharges.

The control signal provided to input 205/206 may be an optical control signal. Accordingly, driver 301 may be configured with fiber-optic receiver 309 to receive the optical control signal and generate an electronic signal for comparison to a reference voltage Vref via amplifier 304. Amplifier 304 may, in turn, generate a control signal which controls operation of transistor 221/225. Additionally, fiber-optic receiver 309 may sense voltage at transistor 221/225 to assist in the control of amplifier 304.

However the invention is not intended to be limited to control over transistor 221/225. Rather, transistor 221/225 may be operated according to a predetermined sequence, as part of a control loop, or even as desired. Accordingly, such control over transistor 221/225 may simply be application specific.

While one circuital embodiment has been shown and described, those skilled in the art should readily recognize that the invention is not intended to be limited to such an embodiment. Rather, driver 301 may be configured in other ways to achieve operational control over transistor 221/225. For example, the reference voltage Vref may be coupled to the noninverting input for comparison to a voltage at the inverting input. Another example may include the use of a microprocessor to generate a control signal.

Figure 5:
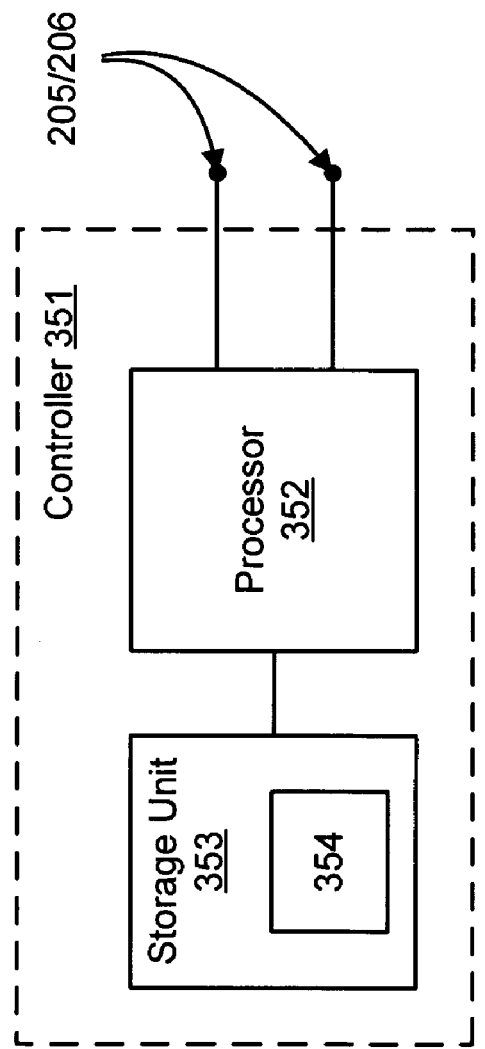
FIG. 5 is a block diagram of an exemplary controller that controls selects zero or more power stages for operation.

FIG. 5 is a block diagram of exemplary controller 351 that controls selects zero or more power stages for operation, such as power stages 203 and 204 of FIG. 2. Controller 351 may be suitable for use as controller 101 of FIG. 1. In this embodiment, controller 351 includes processor 352 and storage unit 353. Processor 352 may be coupled to input 205/206 of driver 301 such that the driver receive a control signal as described above in FIG. 4. For example, processor 352 may generate a control signal that operates driver 301 via input 205/206. In this regard, storage unit 353 may store software instructions 354 that direct processor 352 to control operations of driver 301, which may in turn control transistor 221/225. In one embodiment, processor 352 is configured as an optical processor which generates an optical control signal for application to input 205/206. Accordingly, software instructions 354 may direct processor 352 to indirectly control transistor 221/225 in an application specific manner (e.g., in a manner, according to a predetermined sequence, as part of a control loop, and/or as desired).

Figure 6:
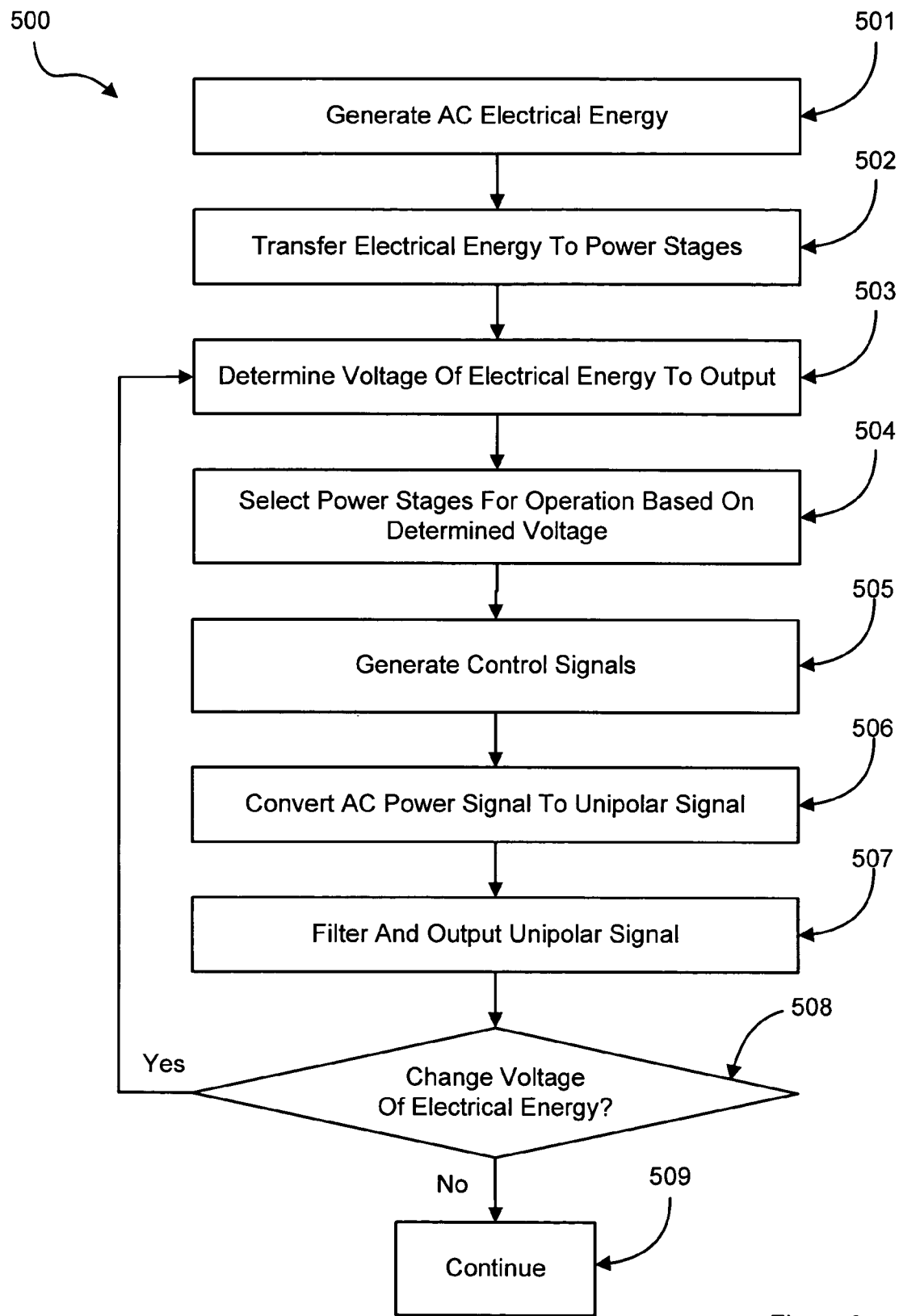
FIG. 6 is a flowchart of an exemplary process for providing electrical energy.

FIG. 6 is a flowchart of exemplary process 500 for providing electrical energy. For example, process 500 may provide AC electrical energy with controllable voltage. In this embodiment, AC electrical energy is generated in process element 501. For example, a power supply, such as power supply 102 of FIG. 1, may provide AC electrical energy greater than about 1V. The electrical energy may then be transferred to power stages, such as power stages 203 and 204 of FIG. 2, for subsequent voltage control, in process element 502.

The output voltage of the electrical energy to be provided may be determined, in process element 503. For example, output voltage of the electrical energy may be decreased or increased depending on a particular application. Such voltage increases and decreases may be performed arbitrarily, according to a predetermined sequence, and/or in response to the condition of the load. Once the voltage is determined, one or more power stages may be selectively operated, in process element 504. For example, when voltage decreases are determined, one or more power stages may be deselected from operation. Similarly, when voltage increases are determined, one or more power stages may be selected for operation.

Based on the selections, control signals may be generated in process element 505 to control selection of the power stages.

Of the power stage(s) selected for operation, the power stage(s) receive the generated AC electrical energy and convert that electrical energy to a unipolar signal, in process element 506. For example, the AC waveform of the electrical energy may be rectified (e.g., full wave rectified) such that all voltage is either positive or negative (i.e., without accounting for bias). The unipolar signal may be filtered and output to a summing node for a particular application, in process element 507. For example, unipolar signals output by selected power stages may add thereby increasing voltage.

Process 500 may additionally include determining whether the voltage of the electrical energy should be changed, in process element 508. For example, when the output voltage is to be increased, additional power stages may be selected for operation. Similarly, when the output voltage is to be decreased, certain power stages may be selected from operation. Accordingly, if a change in the voltage of the electrical energy is to be made process element 508, may return to process element 503 to determine the requisite voltage change such that power stages may be either selected or deselected from operation. If no change in voltage is required, process 500 continues providing electrical energy at the same voltage, in process element 509.

Although one embodiment of process 500 has been shown and described herein, those skilled in the art should readily recognize that the invention is not intended to be limited to the particular illustrated embodiment. For example, certain process elements may be rearranged or configured in other ways that fall within the scope and spirit of the invention. For example, process element 501 may be configured to generate DC electrical energy. As such, converting the AC power signal to a unipolar signal may be unnecessary.

Figure 7:
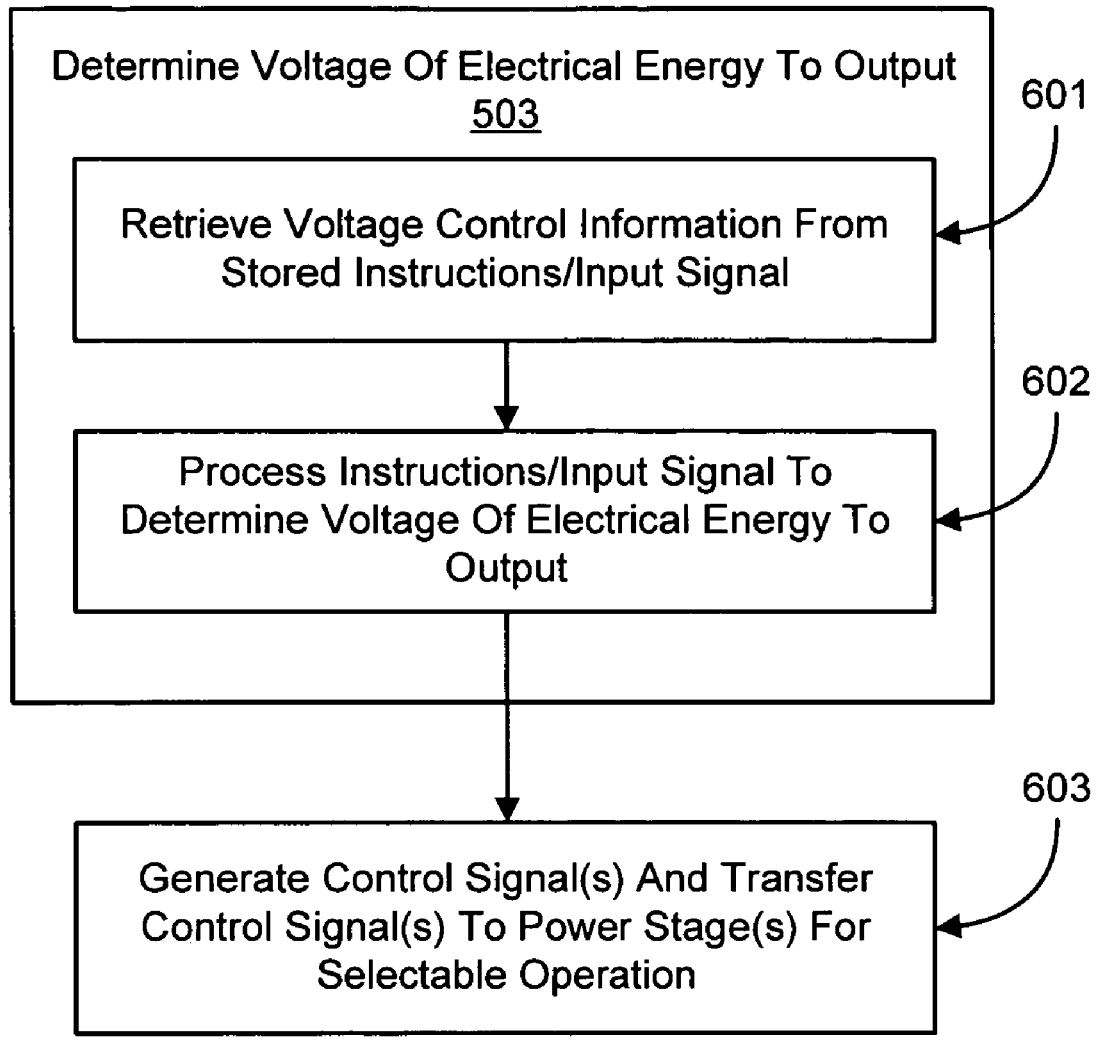
FIG. 7 is a flowchart of exemplary process elements of the process of FIG. 6.

FIG. 7 is a flowchart of exemplary process elements of process 500 of FIG. 6. More specifically, exemplary process element 503 of FIG. 6 is shown as having additional process elements 601 and 602 included therewith and in conjunction with the additional process element of 603. In this embodiment, process element 503 includes retrieving voltage control information from stored instructions and/or an input signal, in process element 601. For example, a driver, such as drivers 202 and 201 of FIG. 2, may receive an input signal which directs the driver to control operability of the power stages. The driver may respond directly to the input signal to control the power stages. For example, the input signal may be an optical control signal generated by a controller, such as controller 101 of FIG. 1. Alternatively, or in addition to, the driver may respond to the input signal by retrieving software instructions that direct the controller to controllably operate the power stages (e.g., via drivers of the power stages). Accordingly, the input signal and/or the instructions may be processed to determine voltage of the electrical energy to be output, in process elements 602. As described hereinabove, power stage control via processing of the input signal and/or processing of software instructions may be performed arbitrarily, according to a predetermined pattern, or as desired.

Once the voltage is determined, the controller may generate one or more control signals and transfer those control signals to various power stages for selectable operation. For example, to scale up the voltage of the electrical energy, the controller may turn on a particular power stage. To scale down the voltage of the electrical energy, the controller may turn off a particular power stage.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A system that provides electrical energy, including:
   a power supply; and
   a power stage configuration including up to 200 power stages, wherein each power stage of the power stage configuration is coupled to the power supply, wherein the power stages are serially coupled to additively control voltage of output electrical energy within a range of about 0 kilovolts to 720 kilovolts.

2. The system of claim 1, wherein each power stage is configured to provide electrical energy having a voltage within a range of about 0 kilovolts to 3.6 kilovolts.

3. The system of claim 2, wherein the power stage configuration outputs electrical energy with the range of about 0 kilovolts to 720 kilovolts in approximate 3.6 kilovolts increments based on selected operations of the power stages.

4. The system of claim 1, further including a controller communicatively coupled to the power stage configuration, wherein the controller controls selection of each power stage of the power stage configuration.

5. The system of claim 4, further including a storage unit that stores instructions, wherein the instructions direct arbitrary selection of the power stages or wherein the instructions direct selection by the controller of the power stages according to a predetermined sequence.

6. The system of claim 1, wherein a first power stage of the power stage configuration includes at least one driver that controls operability of the first power stage.

7. The system of claim 6, wherein the first power stage includes a rectifier and wherein the power supply provides high voltage AC electrical energy and the rectifier receives the high voltage AC electrical energy to provide a substantially unipolar electrical energy.

8. The system of claim 6, wherein said at least one driver includes a signal input that receives a control signal to direct the driver to control said operability of the power stage, wherein the signal input is a fiber optic link, and wherein the driver includes a fiber-optic receiver.

9. The system of claim 1, wherein each of the power stages includes a coil that magnetically couples to the power supply to receive the electrical energy and wherein each of the power stages includes a filter that filters the electrical energy when the power stage is operable, wherein the magnetic coupling of a power stage coil includes an air core.

10. A method of controlling voltage of electrical energy, including:
    generating electrical energy;
    providing the electrical energy to a power stage configuration that includes up to 200 power stages, wherein the power stages are serially coupled to additively control voltage of the electrical energy; and
    controlling operability of the power stages to output the electrical energy within a range of about 0 kilovolts to 720 kilovolts.

11. The method of claim 10, further including outputting the electrical energy within the range of about 0 kilovolts to 720 kilovolts in approximate 3.6 kilovolts increments, wherein each power stage is configured to provide electrical energy having a voltage within a range of about 0 kilovolts to 3.6 kilovolts.

12. The method of claim 10, wherein providing the electrical energy includes magnetically coupling generated electrical energy to the power stages of the power stage configuration, wherein the magnetic coupling of a power stage coil includes an air core.

13. The method of claim 12, wherein controlling operability of the power stages includes generating at least one control signal to operate at least one switch with a first power stage of the power stage configuration, wherein generating at least one control signal includes processing instructions that arbitrarily direct the first power stage to conduct the electrical energy or that direct the first power stage to conduct the electrical energy according to a predetermined sequence.

14. The method of claim 10, wherein the electrical energy is AC electrical energy and the method further includes filtering the electrical energy when one or more of the power stages are operable and wherein the method further includes converting the AC electrical energy to unipolar electrical energy.

15. A system that provides electrical energy having a voltage within a range of about 0 kilovolts and 720 kilovolts, including:
- a power supply;
- up to 200 power stages coupled to the power supply, wherein the power stages are operable to receive electrical energy from the power supply, wherein each power stage is configured to output the electrical energy with a voltage in a range of about 0 volts and 3.6 kilovolts, and wherein each power stage includes at least one driver; and
- a controller coupled to said at least one driver of each power stage, wherein the controller directs the drivers, either arbitrarily or according to a predetermined sequence, to control operability of the power stages, wherein the power stages are serially coupled such that operable power stages additively combine voltages of the electrical energy at an output of the system.

16. The system of claim 15, wherein the power supply is coupled to the power stages via magnetic couplings, wherein each power stage has a power stage coil and an air core.

* * * * *

UNITED STATES PATENT AND TRADEMARK OFFICE
CERTIFICATE OF CORRECTION

| | |
|---|---|
| PATENT NO. | : 7,394,226 B2 |
| APPLICATION NO. | : 11/345857 |
| DATED | : July 1, 2008 |
| INVENTOR(S) | : Adler |

It is certified that error appears in the above-identified patent and that said Letters Patent is hereby corrected as shown below:

At column 1, line 16, please correct "and" to read --and copending--.

At column 1, lines 18-19, please correct "2006 hereinafter referred to as the "U.S. Pat. No. 7,345,430") and" to read --2006, hereinafter referred to as "U.S. Pat. No. 7,345,430"),--.

At column 8, line 9, please correct "received in" to read --receive and--.

Signed and Sealed this

Sixteenth Day of September, 2008

JON W. DUDAS
*Director of the United States Patent and Trademark Office*